United States Patent
Ring et al.

(10) Patent No.: US 7,493,482 B2
(45) Date of Patent: Feb. 17, 2009

(54) SELF-CONFIGURABLE INFORMATION MANAGEMENT SYSTEM

(75) Inventors: Paul Alan Ring, Dunlap, IL (US); Michael James Wallis, Washington, IL (US); Stuart Clayton Johnson, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 381 days.

(21) Appl. No.: 11/312,437

(22) Filed: Dec. 21, 2005

(65) Prior Publication Data

US 2007/0143585 A1 Jun. 21, 2007

(51) Int. Cl.
*G06F 9/00* (2006.01)
*G06F 15/177* (2006.01)

(52) U.S. Cl. .................. 713/1; 713/2; 713/100
(58) Field of Classification Search ............. 713/1
See application file for complete search history.

(56) References Cited

U.S. PATENT DOCUMENTS

| | | | |
|---|---|---|---|
| 5,809,234 A | 9/1998 | Le Van Suu | |
| 6,029,196 A * | 2/2000 | Lenz | 709/221 |
| 6,324,592 B1 | 11/2001 | Hindman | |
| 6,370,603 B1 | 4/2002 | Silverman et al. | |
| 6,477,611 B1 | 11/2002 | Chang | |
| 6,493,827 B1 * | 12/2002 | Mueller et al. | 713/300 |
| 6,526,460 B1 | 2/2003 | Dauner et al. | |
| 6,611,888 B2 | 8/2003 | Tiede | |
| 6,640,271 B2 | 10/2003 | Ehrenhardt et al. | |
| 6,928,358 B2 | 8/2005 | Brooks et al. | |
| 2001/0032031 A1 | 10/2001 | Ufheil | |
| 2002/0199184 A1 * | 12/2002 | Cezeaux | 725/9 |
| 2003/0114966 A1 | 6/2003 | Ferguson et al. | |
| 2003/0182033 A1 | 9/2003 | Underdahl et al. | |
| 2003/0195687 A1 | 10/2003 | Keefer | |
| 2004/0024510 A1 | 2/2004 | Finley et al. | |
| 2004/0081104 A1 * | 4/2004 | Pan et al. | 370/254 |
| 2006/0064486 A1 * | 3/2006 | Baron et al. | 709/224 |

FOREIGN PATENT DOCUMENTS

| | | |
|---|---|---|
| WO | WO 90/12366 | 10/1990 |
| WO | WO 00/20989 | 4/2000 |

* cited by examiner

*Primary Examiner*—Tuan N Du
*Assistant Examiner*—Michael J Brown
(74) *Attorney, Agent, or Firm*—Finnegan, Henderson, Farabow, Garrett & Dunner

(57) ABSTRACT

Systems and methods are disclosed for automatically configuring an information management system of a work machine. A configuration method for an information management system includes requesting configuration data associated with one or more control modules. The method also includes receiving the configuration data associated with the one or more control modules in response to the request. The method further includes updating an information management system based on the received configuration data, wherein the update defines one or more operating parameters associated with the information management system.

24 Claims, 4 Drawing Sheets

SELF-CONFIGURABLE INFORMATION MANAGEMENT SYSTEM

TECHNICAL FILED

This application relates to an information system and, more particularly to a self-configurable information management system for a work machine.

BACKGROUND

Work machines such as, for example, wheel loaders, motor graders, track-type tractors, dump trucks, and other types of machinery are used to perform a variety of tasks associated with an industry such as, mining, construction, manufacturing, transportation, or any other such industry. These work machines may include systems that collect operation data associated with one or more components of the work machine and distribute the collected data to an external system.

Typically, these systems are designed for use in a particular type of work machine and configured to monitor only those components associated with that type of machine. Thus, systems designed for use in one type of work machine may require extensive manual reconfiguration and/or redesign prior to deployment in a different work machine, which may result in increased manufacturing costs and decreased monitoring system flexibility.

One method that has been developed to provide a more flexible monitoring system is described in U.S. Patent Application No. 2003/0182033 ("the '033 publication") to Underdahl et al. The '033 publication describes a system for tracking the usage habits of a vehicle. The system of the '033 publication includes a communication port, a data storage medium, and a programmable processor configured to record usage data related to the use of the vehicle based on user-specified parameters. The system may also transmit the recorded data to a remote data device over the communication port in response to a query from the remote data device.

Although the system of the '033 publication may increase data monitoring flexibility by allowing users to specify the parameters that are recorded and transmitted, it may still suffer from the same flexibility problems as other conventional systems. For example, because the system is configured to record and transmit only usage data designated by a user, manual configuration of the system may still be required. Not only is such a practice cumbersome, but it may lead to the oversight of operational parameters by the user. Furthermore, because the system requires manual reconfiguration for each vehicle in which the system is installed, mass-deployment of the system of the '033 publication may be time consuming and inefficient.

Furthermore, the system of the '033 publication does not automatically update itself based on changes in a configuration of the vehicle. As a result, should a configuration of a vehicle component change, the system of the '033 publication may not appropriately respond to these changes. Thus, systems that rely on data collected from a particular component of the vehicle may become inaccurate and/or unreliable if not manually reconfigured by the user.

The disclosed information management system is directed towards overcoming one or more of the problems set forth above.

SUMMARY OF THE INVENTION

In accordance with one aspect, the present disclosure is directed toward a configuration method for an information management system of a work machine. The method may include requesting configuration data associated with one or more control modules. The method may also include receiving the configuration data associated with the one or more control modules in response to the request. The method may further include updating a configuration of the information management system based on the received configuration data, wherein the update defines one or more operating parameters associated with the information management system.

According to another aspect, the present disclosure is directed toward an information management system for a work machine. The system may include a computer-readable medium including instructions that, when executed by a processor, may be configured to request configuration data associated with one or more control modules. The processor may also execute instructions configured to receive the configuration data associated with the one or more control modules in response to the request. The processor may further execute instructions configured to update the configuration of the information management system based on the received configuration data, wherein the update defines one or more operating parameters associated with the information management system.

In accordance with yet another aspect, the present disclosure is directed to a work machine. The work machine may include one or more control modules configured to collect operation data associated with one or more components associated with the work machine. The work machine may also include an information management system configured to request configuration data associated with one or more control modules. The information management system may also be configured to receive the configuration data associated with the one or more control modules in response to the request. The information management system may further be configured to update a configuration of the information management system based on the received configuration data, wherein the update defines one or more operating parameters associated with the information management system.

DETAILED DESCRIPTION

Figure 1:
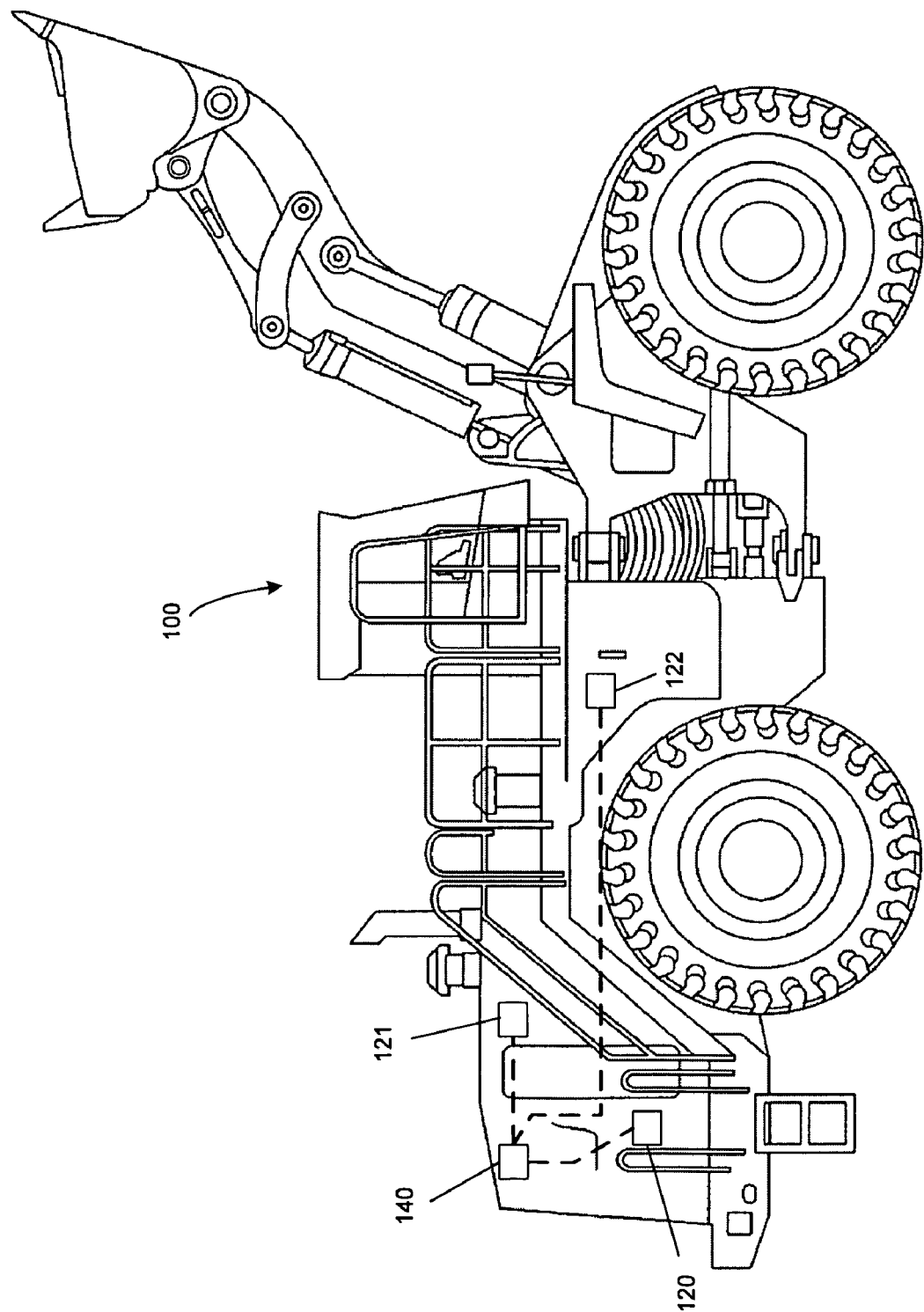
FIG. 1 illustrates work machines employing an information management system according to an exemplary disclosed embodiment.

FIG. 1 illustrates an exemplary disclosed work machine 100. Work machine, as the term is used herein, refers to a fixed or mobile machine that may perform some type of operation associated with a particular industry, such as mining, construction, farming, etc., that operates between or within work environments (e.g., a construction site, mine site, power plant, etc.) A non-limiting example of a fixed machine includes an engine system operating in a plant or off-shore environment (e.g., off-shore drilling platform). A non-limiting example of a mobile machine includes any commercial machine, such as a truck, crane, earth moving vehicle, mining vehicle, backhoe, material handling equipment, farming equipment, marine vessels, aircraft, on-highway vehicle, or any other movable machine that operates in a work environment. Accordingly, although FIG. 1 illustrates work machine 100 as a wheel loader it is contemplated that work machine 100 may include any type of work machine.

Work machine 100 may include one or more devices or systems that cooperate to control and/or monitor operations associated with work machine 100. For instance, work machines 100 may include, among other things, one or more control modules 120-122 and an information management system 140. Although FIG. 1 illustrates control modules 120-122 and information management system 140 as separate components, it is contemplated that information management system 140 may be combined with one or more control modules 120-122 as a single unit. Furthermore, work machine 100 may include additional and/or different components than those listed above.

Control modules 120-122 may each include a device that is configured to monitor and/or control an operation associated with one or more components of work machine 100. For example, control module 120 may be associated with an internal combustion engine associated with work machine 100 to monitor and/or control an operation of the engine. In particular, control module 120 may be operable to monitor and/or control an exhaust pressure of the engine, a flow rate or temperature of fluid flowing through the cooling system of the engine, an air/fuel mixture supplied to a combustion chamber, a gas sensor of an exhaust system of the engine, or any other function of the internal combustion engine.

Additionally, control module 121 may be associated with a regeneration system associated with work machine 100. For example, control module 121 may be operable to monitor and/or control a particulate sensor associated with a particulate trap, a regenerative element associated with a particular filter, an exhaust flow sensor associated with the exhaust system, or any other aspect associated with the regeneration system.

Similarly, control module 122 may be associated with a cooling system of work machine 100 to monitor and/or control the operation and performance of the cooling system. For example, control module 122 may be operable to monitor and/or control a constant pressure valve for maintaining a coolant pressure, a displacement of a hydraulic pump, a temperature sensor for monitoring the temperature of a coolant, a viscosity of a coolant flowing through the cooling system.

Control modules 120-122 may each be configured to collect operation data associated with one or more components of work machine 100. For example, control modules 120-122 may each receive data indicative of operational characteristics associated with a particular component collected by one or more monitoring devices (not shown) during an operation of work machine 100. Control modules 120-122 may receive this data automatically in response to an event (e.g., work machine start-up, ECM activation, etc.) or based on a request provided to a respective component. For purposes of this disclosure, operation data may include data indicative of an operational characteristic of a work machine (or its associated components) that is collected during operation of the work machine. For instance, operation data may include data reflecting a physical parameter (e.g., temperature, pressure, flow rate, etc.), an electrical parameter (current, voltage, power, etc.), a mechanical parameter (e.g., load, weight, stress, strain, vibrations, etc.), a fault condition (e.g., engine overload, power loss, etc.), a warning signal (e.g., low fuel, high temperature, etc.), or any other type of data indicative of an operation of the work machine or its associated components. It is contemplated that operation data may include additional and/or different operational aspects than those listed above.

Control modules 120-122 may each be configured to provide information management system 140 with configuration data associated with the respective control module. For instance, a control modules 120-122 may each receive a request from information management system 140 upon activation of work machine 100. Control modules 120-122 may each transmit configuration data to information management system 140 in response to the request. Configuration data, as the term is used herein, includes data indicative of a current configuration or status of a control module. Configuration data may include one or more parameters reflective of the setup, arrangement, functionality, operability, and interaction of the control module and components associated with the control module. For instance, configuration data may describe the physical and operational parameters associated with the respective control module, such as the number of components associated with the control module, the type of each component, an ID number associated with one or more components, one or more operational characteristics of the components, interactions between components, etc. Furthermore, configuration data may also include port locations of components that may be coupled to the control module, software/firmware information associated with the control modules or any of its associated components, status information associated with each component, and/or data elements associated with each component.

Figure 2:
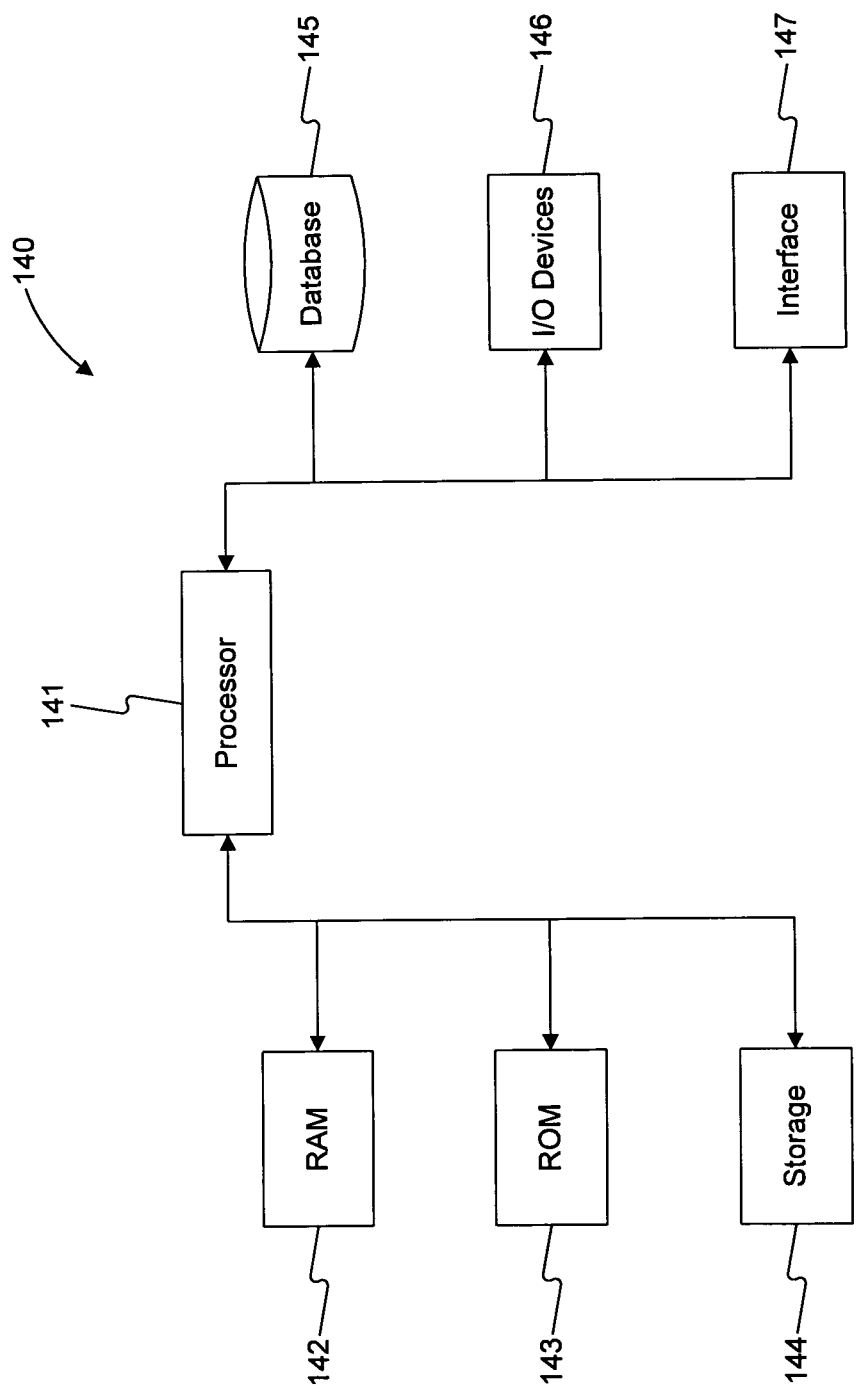
FIG. 2 illustrates an information management system according to an exemplary disclosed embodiment.

As illustrated in FIG. 2, information management system 140 may include any means for collecting, analyzing, monitoring, storing, reporting, processing, and/or communicating data. For example, information management system 140 may include a central processing unit (CPU) 141, a random access memory (RAM) 142, a read only memory (ROM) 143, a storage 144, a database 145, I/O devices 146, a network interface 147, etc. Information management system 140 may be configured to execute and run software programs that collect, analyze, store, transmit, organize, and monitor various data associated with work machine 100.

CPU 141 may include one or more processors that can execute instructions and process data to perform one or more processes associated with information management system 140. For instance, CPU 141 may execute software that enables information management system to request and/or receive configuration data from one or more control modules 120-122. CPU 141 may update the operational parameters associated with information management system 140 based on the received configuration data and the determined work machine type. CPU 141 may also execute software that collects and distributes operation data to one or more off-board systems based on the configuration data.

Storage 144 may include a mass media device operable to store any type of information needed by CPU 141 to perform processes associated with information management system 140. Storage 144 may include one or more magnetic or optical disk devices, such as hard drives, CD-ROMs, DVD-ROMs, or any other type of mass media device.

Database 145 may include one or more memory devices that store data used by information management system 140 and/or CPU 141. For example, database 145 may store predetermined data associated with work machine 100. Database 145 may also store a component inventory associated with the components of work machine 100, including predetermined configuration data of each control module and the components associated with each control module associated with work machine 100. Database 145 may also store operational parameters for each component associated with work machine 100, including operating ranges for the components, threshold levels, etc.

Database 145 may contain identifying information corresponding to various components associated with work machine 100. For example, database 145 may contain a serial numbers, ID numbers, component model numbers, or any other type of information formatted to identify one or more components associated with work machine 100. Moreover, database 145 may contain data elements indicative of operational characteristics associated with each component.

Input/Output (I/O) devices 146 may include one or more devices operable to communicate with systems or networks external to work machine 100 such as, for example, the Internet, one or more computer systems, a communication network, a PCS network, or any other suitable network. I/O devices 146 may include one or more communication devices, such as a network card, a wireless transceiver, or any other device for providing a communication interface between information management system 140 and an external component.

Interface 147 may include hardware and/or software components that allow a user to access information stored in information management system 140. For example, information management system 140 may include a data access interface that includes a graphical user interface (GUI) that allows external users to access, configure, store, and/or download information to external systems, such as computers, PDAs, diagnostic tools, or any other type of external data device. Moreover, interface 147 may allow a user to access and/or modify information, such as operational parameters, operating ranges, and/or threshold levels associated with one or more component configurations, stored in database 145.

Information management system 140 may be operatively coupled to each of control modules 120-122 and configured to communicate information with each control module. For example, information management system 140 may be configured with one or more ports operable to transmit and receive information to and from control modules 120-122. Information management system 14 may be coupled to control modules 120-122 via any wired or wireless medium suitable for data transmission such as, for example, a data wire, an Ethernet connection, a fiber optic link, a microwave communication channel, Bluetooth, or any other type of medium for communicating information between information management system 140 and control modules 120-122.

Information management system 140 may be configured to request configuration data associated with one or more control modules 120-122. Specifically, information management system 140 may query each of control modules 120-122 prompting control modules 120-122 to respond by providing configuration data. For example, upon activation of work machine 100, information management system 140 may transmit a request signal to control module 120 associated with the internal combustion engine. It is contemplated that information management system 140 may request configuration data in response to an event (i.e., work machine startup, status change, etc.) or periodically (in predetermined time increments, during a CPU clock pulse, etc.)

Information management system 140 may be operable to receive the configuration data in response to the request. Specifically, information management system 140 may receive the configuration data automatically in response to the request provided to control modules 120-122. For example, information management system may receive ID numbers. Alternatively and/or additionally, information management system 140 may actively detect one or more of the control modules and extract the configuration data from control modules 120-122.

Information management system 140 may be operable to automatically collect and/or distribute operation data associated with one or more components of work machine 100 based on the received configuration data from each of control modules 120-122. For example, information management system 140 may receive component ID numbers from control module 120 associated with the internal combustion engine. CPU 141 associated with information management system 140 may search database 145 and identify one or more components, such as, for example, an air flow sensor, a pressure sensor, an air/fuel mixture sensor, an exhaust sensor, and a temperature sensor corresponding with the ID numbers received from control module 120. CPU 141 may also identify one or more operational characteristics associated with each component, such as flow rate, pressure, mixture percentage, exhaust composition, and temperature along with any predefined ranges associated with each characteristic (e.g., nominal operating ranges).

CPU 141 may load each component along with its corresponding operational characteristics and define one or more operating parameters associated with information management system 140. Operating parameters may include one or more characteristics that define the mode of operation of information management system 140. For example, operating parameters may include instructions for collecting and distributing data based on the configuration of control modules associated with information management system 140. These instructions may define, among other things, a frequency that each component is queried for operation data, a format in which operation data is distributed, a reporting interval that operation data is sent by information management system 140 to an external system (e.g., every minute, every hour, during a fault event, etc.), a destination address of an external system, or any other suitable instruction that establishes how information management system 140 operates.

Methods and systems consistent with certain disclosed embodiments may provide a universal, information management system 140 for a work machine that automatically adapts to a particular type of work machine based on the configuration of the work machine components and/or control modules. In one embodiment, information management system 140 may automatically configure itself based on the configuration of each control module associated with a particular work machine. The configuration of information management system 140 may dictate the collecting and reporting requirements for operation data received by information management system 140. Thus, different types of work machines may include different components, configurations, and operational parameters that each may require specific monitoring requirements. An exemplary configuration method associated with one embodiment is described below.

Figure 3:
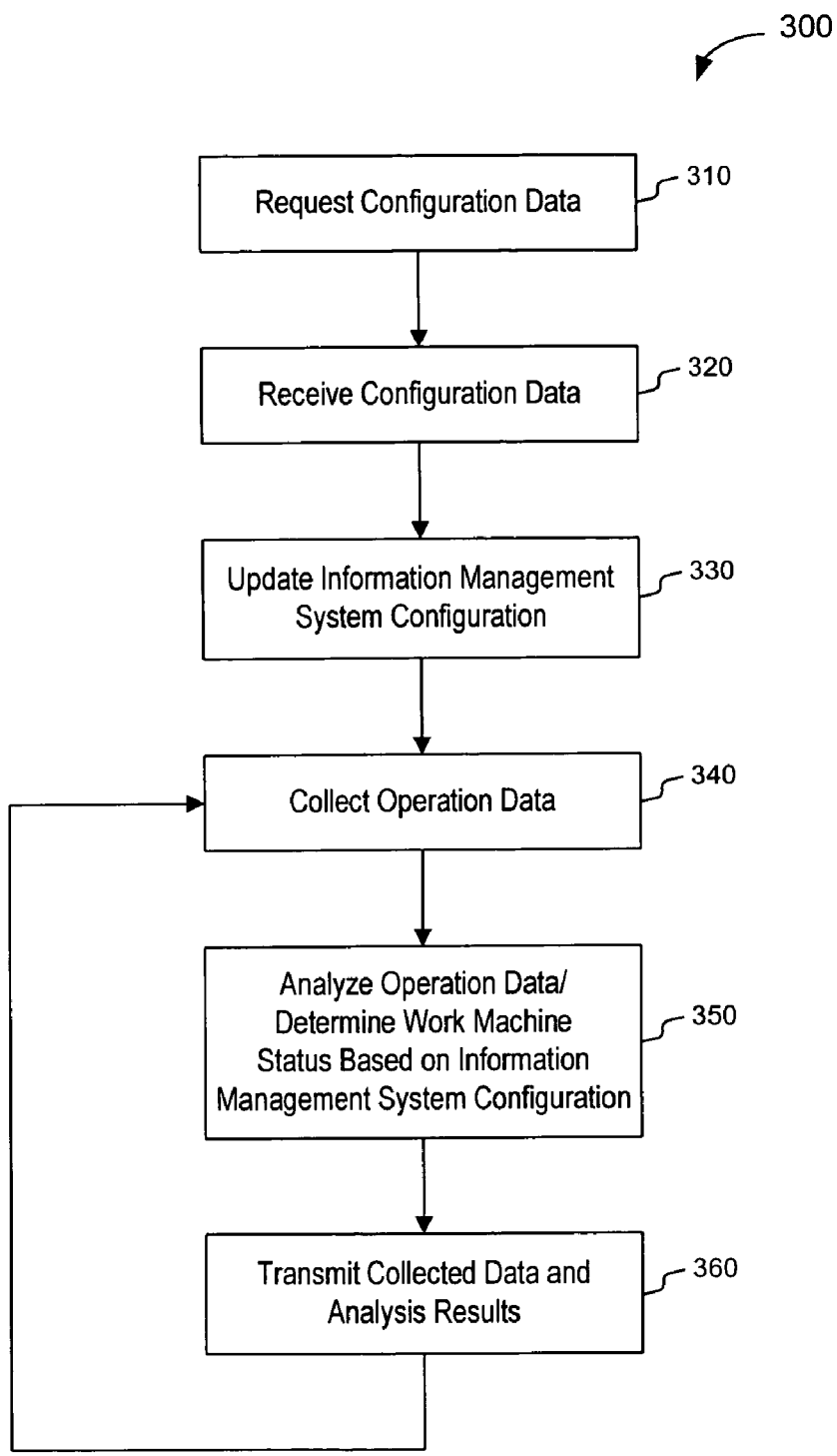
FIG. 3 illustrates a flowchart depicting an exemplary disclosed configuration method.

FIG. 3 shows a flowchart 300 of an exemplary disclosed configuration method. As shown in FIG. 3, information management system 140 associated with information management system 140 may request configuration data from one or more control modules associated with a particular work machine (Step 310). For example, when installed in work machine 100, information management system 140 may automatically detect one or more control modules, such as control modules 120-122, and request configuration data associated with each control module.

At some point, information management system 140 may receive configuration data from one or more control modules 120-122 associated work machine 100 (Step 320). Information management system 140 may receive the configuration data in response to the request. Alternatively and/or additionally, information management system 140 may automatically receive the configuration data upon activation of the respective work machine.

Upon receipt of the configuration data from control modules 120-122, information management system 140 may analyze the configuration data and update itself in response to the configuration data associated with control modules 120-122 (Step 330). For instance, based on the configuration data received from control modules 120-122, information management system 140 may identify one or more components and/or component parameters from among the configuration data. Information management system 140 may automatically program/configure itself to collect and report data associated with those components and/or component parameters based on predetermined (and/or user-defined) monitoring guidelines associated with each component.

Once information management system 140 has updated itself, operation data may be collected from each of control modules 120-122 (Step 340). For instance, information management system 140 may receive data reflecting operational aspects of one or more components from control modules 120-122 during an operation of a respective work machine. CPU 141 associated with information management system 140 may store the operation data in database 145 for future analysis and/or transmit the data to an external system.

Information management system 140 may analyze the collected operation data and determine a status of the work machine based on the collected operation data (Step 350). In one illustrative example, information management system 140 may analyze collected operation data reflecting a speed of an electric motor of work machine 100. Information management system 140 may subsequently determine a status of the electric motor based on the analysis of the collected operation data. Similarly, information management system 140 may analyze operation data associated with other components of work machine 100, to determine the status of each component and/or the status of work machine 100.

Information management system 140 may provide the collected operation data and/or analysis results in accordance with the updated information management system configuration (Step 360). For instance, information management system 140 may transmit the collected operation data and/or analysis results to an external system based on the reporting requirements specified by the updated information management system configuration. Alternatively and/or additionally, for particular work machine parameters, information management system 140 may be configured to only report information when a system is operating outside a threshold range as determined using the predetermined operation data stored in database 145. Thus, the auto-configuration process for updating an information management system configuration may include specifying data collecting and reporting guidelines for information management system 140.

Figure 4:
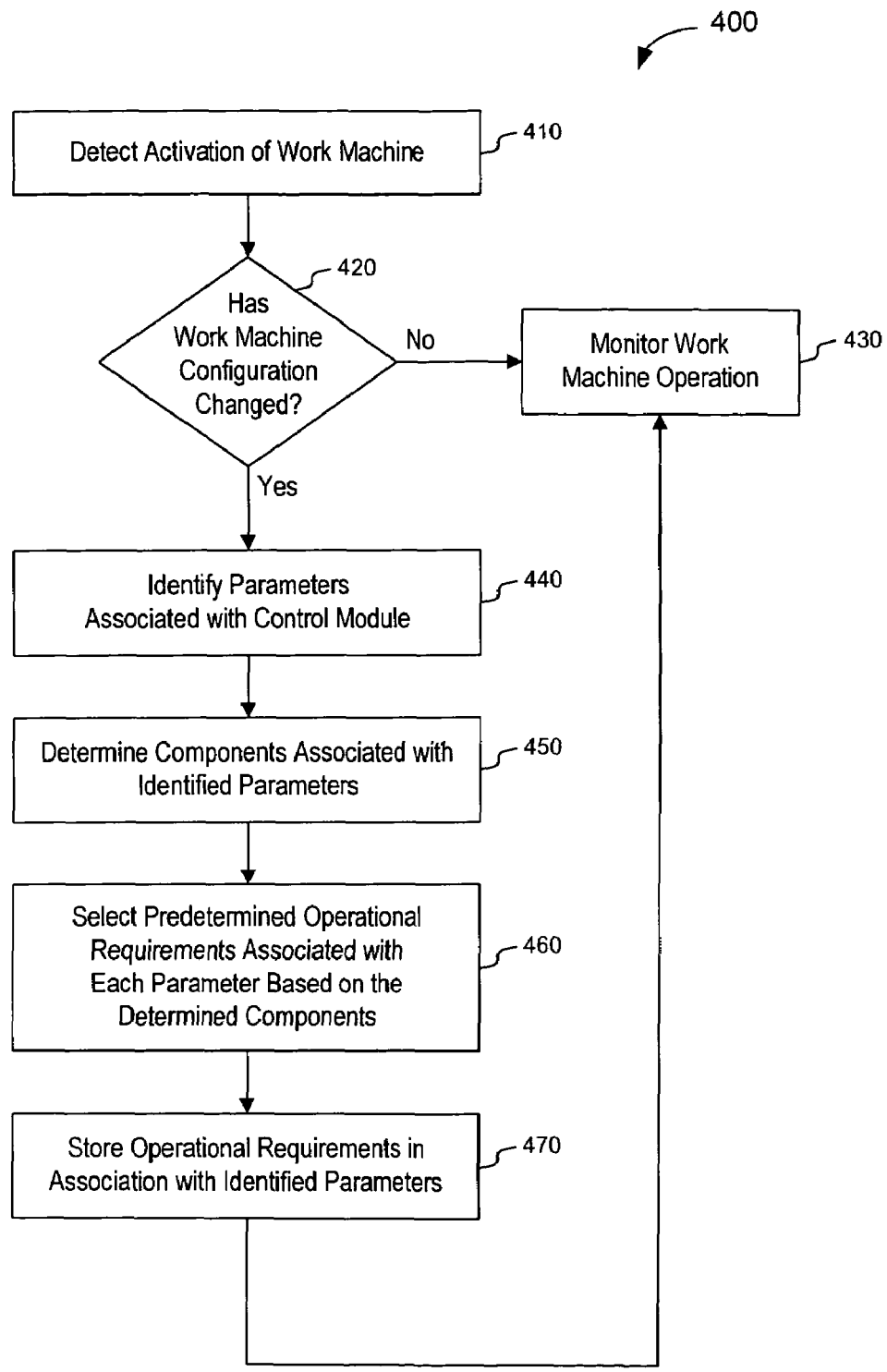
FIG. 4 illustrates a flowchart depicting an exemplary disclosed auto-configuration process.

FIG. 4 illustrates an exemplary flowchart 400 of an exemplary process for auto-configuring an information management system for a work machine. Initially, information management system 140 may detect an activation sequence associated with work machine 100 (Step 410). Subsequently, information management system 140 may automatically request configuration data from each of the control modules associated with a respective work machine upon activation of the work machine. Information management system 140 may receive configuration data from each of the control modules associated with the respective work machine.

Information management system 140 may determine if the configuration data received from the control modules differs from configuration data received during previous operation of information management system 140 (Step 420). For instance, CPU 141 associated with information management system 140 may execute processes to compare the received configuration data with previous configuration data stored in database 145 associated with a previous operation of information management system 140. If the received configuration data has not changed from previous configuration data (Step 420: No), information management system 140 may monitor operations of the work machine (Step 430) without modification.

If the received configuration data is determined to have changed when compared to previous configuration data (Step 420: Yes), information management system 140 may analyze the configuration data to identify the components and/or component parameters associated with each control module 120-122 (Step 440). For instance, information management system 140 may determine, based on received configuration data, that a particular control module for an electric drive system includes a generator and an electric motor coupled to one or more traction devices. Information management system 140 may further identify operational parameters associated with each component.

Information management system 140 may determine one or more components of work machine corresponding to the identified parameters associated with each control module (Step 450). For instance, CPU 141 associated with information management system 140 may compare the configuration data received from each control module with configuration information stored in database 145 associated with each component of work machine 100. CPU 141 may identify one or more components based on a match obtained from the comparison of the received configuration data with the stored configuration data.

Because each component may exhibit different operational characteristics depending upon its application within a particular work machine, it may be necessary to provide information management system 140 with predetermined specifications for monitoring each component associated with the work machine. Thus, upon identifying one or more components corresponding with the configuration data, information management system 140 may gather and store the predetermined operational requirements associated with each component of the work machine (Step 460). For example, information management system 140 may select particular operational requirements for an electric motor associated with the electric drive system from among a plurality of operational requirements stored in database 145. Operational requirements may include any specification that is used to determine a status of a component during an operation such as, a threshold value, a parameter range, a tolerance, a design specification, or any other type of specification for determining the status of a component. These operational requirements may be used in analyzing the operation data associated with the electric motor collected during operation of the work machine. Furthermore, it is contemplated that operational requirements may include additional and/or different specifications than those listed above, such as, guidelines for monitoring, collecting, recording, and/or storing operation data received from the control modules.

The operational requirements may be stored in database 145 associated with information management system 140 for use in analysis of received operation data collected during operation of work machine 100 (Step 470). Once the predetermined operational requirements have been stored, information management system 140 may monitor operation of the work machine (Step 430).

INDUSTRIAL APPLICABILITY

Methods and systems consistent with the disclosed embodiments may provide an information management system that adapts to changing configuration of a particular work machine. Work machines that employ processes and elements consistent with the disclosed embodiments may collect, analyze, and provide operation data based on the configuration of one or more components associated with the work machine, without requiring extensive re-configuration of their information management systems to account for changes in component configuration.

Although the disclosed embodiments are described in association with a work machine environment, the disclosed information management system functions described herein may be applicable to any environment where it may be desirable to monitor the operations of different types of equipment using a single unit. Specifically, the disclosed information management system may identify one or more equipment configurations and configure itself to monitor the equipment according to predetermined specifications.

According to one embodiment, information management system 140 may be adapted for any work machine environment where it may be desirable to monitor various types of work machines using a single, self-configurable system. Because information management system 140 may automatically configure itself to receive, analyze, and transmit operation data, information management system 140 may require little or no manual configuration once deployed.

Because information management system 140 may be placed on any machine where it may automatically configure itself based on the configuration of the components of the machine, information management system 140 may provide increased flexibility. For example, one or more components of a work machine may be altered, substituted, removed, added, etc. without requiring manual reconfiguration of information management system 140.

Because the information management system described above may be capable of automatically detecting components associated with a work machine and automatically configuring itself based on the detected components. Thus, efficiency problems associated with the manual configuration of the information management system based on changes in work machine configuration may be significantly reduced. For example, information management system 140 may reduce or eliminate time or productivity losses associated with manually configuring information management system 140 based on changes to components associated with work machine 100.

In addition, the disclosed embodiments associated with information management system 140 may increase the reliability of work machine data collection and transmission. For example, because information management system 140 can include predetermined configuration data for each work machine type stored in database 145, errors associated with improper data entry may be reduced or eliminated.

Personnel and equipment productivity may be increased as information management system 140 requires little or no configuration once installed in a particular work machine. Should a configuration of the work machine change during maintenance or repair, information management system 140 may detect the changes and automatically configure itself accordingly. Thus, maintenance time and equipment downtime may be significantly reduced when compared to conventional systems that require manual configuration of information management systems.

It will be apparent to those skilled in the art that various modifications and variations can be made to the disclosed self-configurable information management system without departing from the scope of the invention. Other embodiments of the present disclosure will be apparent to those skilled in the art from consideration of the specification and practice of the present disclosure. It is intended that the specification and examples be considered as exemplary only, with a true scope of the present disclosure being indicated by the following claims and their equivalents.

What is claimed is:

1. A method for configuring an information management system of a machine, comprising:
   requesting configuration data associated with a current configuration or status of one or more control modules associated with a machine;
   receiving the configuration data associated with the one or more control modules in response to the request; and
   updating a configuration of the information management system based on the received configuration data, wherein updating a configuration of the information management system includes:
      identifying one or more components associated with each of the one or more control modules;
      identifying one or more operational characteristics associated with the identified components;
      determining a machine configuration based on at least one of the identified components and the identified operational characteristics associated with the identified components; and
      configuring the information management system to collect operation data associated with the one or more control modules based on the machine configuration.

2. The method of claim 1, wherein receiving the configuration data further includes:
   detecting the one or more control modules upon activation of the machine; and
   extracting configuration data from the one or more control modules.

3. The method of claim 1, wherein updating the information management system includes automatically configuring information management system to:
   collect operation data from the one or more control modules based on the configuration data associated with the one or more control modules; and
   transmit the operation data to an external system.

4. The method of claim 1, wherein the one or more operating parameters include identifying information associated with one or more components operatively coupled to the control module.

5. The method of claim 1, wherein the one or more operating parameters include identifying information associated with one or more operational characteristics collected by the control module.

6. The method of claim 1, further including automatically requesting the configuration data from the one or more control modules upon activation of the machine.

7. The method of claim 1, further including automatically detecting changes in configuration data associated with the one or more control modules and further updating the information management system in response to the detected changes.

8. The method of claim 1, wherein the information management system includes a software program loaded in a computer-readable storage medium associated with one of the one or more control modules.

9. An information management system for a machine, comprising:
a computer-readable storage medium including instructions that, when executed by a processor, are configured to:
request configuration data associated with one or more control modules associated with a machine;
receive the configuration data associated with the one or more control modules in response to the request; and
update a configuration of itself based on the received configuration data, wherein the update includes:
identifying one or more components associated with each of the one or more control modules;
identifying one or more operational characteristics associated with the identified components;
determining a machine configuration based on at least one of the identified components and the identified operational characteristics associated with the identified components; and
configuring the information management system to collect operation data associated with the one or more control modules based the machine configuration.

10. The system of claim 9, wherein receiving the configuration data further includes:
detecting the one or more control modules upon activation of the machine; and
extracting configuration data from the one or more control modules.

11. The system of claim 9, wherein updating the information management system includes automatically configuring information management system to:
collect operation data from the one or more control modules based on the configuration data associated with the one or more control modules; and
transmit the operation data to an external system.

12. The system of claim 9, wherein the one or more operating parameters include identifying information associated with one or more components operatively coupled to the control module.

13. The system of claim 9, wherein the one or more operating parameters include identifying information associated with one or more operational characteristics collected by the control module.

14. The system of claim 9, further including automatically requesting the configuration data from the one or more control modules upon activation of the machine.

15. The system of claim 9, further including automatically detecting changes in configuration data associated with the one or more control modules and further updating the information management system in response to the detected changes.

16. The system of claim 9, wherein the information management system includes a software program loaded in a computer-readable storage medium associated with one of the one or more control modules.

17. A machine, comprising:
one or more control modules configured to collect operation data associated with one or more components associated with the machine;
an information management system configured to:
request configuration data associated with one or more control modules associated with a machine;
receive the configuration data associated with the one or more control modules in response to the request; and
update a configuration of itself based on the received configuration data, wherein the update includes:
identifying the one or more components associated with each of the one or more control modules;
identifying one or more operational characteristics associated with the identified components;
determining a machine configuration based on at least one of the identified components and the identified operational characteristics associated with the identified components; and
configuring the information management system to collect operation data associated with the one or more control modules based on the machine configuration.

18. The machine of claim 17, wherein receiving the configuration data further includes:
detecting the one or more control modules upon activation of the machine; and
extracting configuration data from the one or more control modules.

19. The machine of claim 17, wherein updating the information management system includes automatically configuring information management system to:
collect operation data from the one or more control modules based on the configuration data associated with the one or more control modules; and
transmit the operation data to an external system.

20. The machine of claim 17, wherein the one or more operating parameters include identifying information associated with the one or more components operatively coupled to the control module.

21. The machine of claim 17, wherein the one or more operating parameters include identifying information associated with one or more operational characteristics collected by the control module.

22. The machine of claim 17, further including automatically requesting the configuration data from the one or more control modules upon activation of the machine.

23. The machine of claim 17, further including automatically detecting changes in configuration data associated with the one or more control modules and further updating the information management system in response to the detected changes.

24. The machine of claim 17, wherein the information management system includes a software program loaded in a computer-readable storage medium associated with one of the one or more control modules.

* * * * *